(12) United States Patent
Jimenez

(10) Patent No.: US 12,077,472 B2
(45) Date of Patent: Sep. 3, 2024

(54) CONCRETE ADMIXTURE

(71) Applicant: SIKA TECHNOLOGY AG, Baar (CH)

(72) Inventor: Ana Jimenez, Rutherford, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 916 days.

(21) Appl. No.: 17/059,520

(22) PCT Filed: Jul. 10, 2019

(86) PCT No.: PCT/EP2019/068491
§ 371 (c)(1),
(2) Date: Nov. 30, 2020

(87) PCT Pub. No.: WO2020/016072
PCT Pub. Date: Jan. 23, 2020

(65) Prior Publication Data
US 2021/0300823 A1 Sep. 30, 2021

(30) Foreign Application Priority Data

Jul. 17, 2018 (EP) ..................... 18184042

(51) Int. Cl.
| C04B 14/06 | (2006.01) |
| B82Y 30/00 | (2011.01) |
| C04B 28/02 | (2006.01) |
| C04B 103/50 | (2006.01) |
| C04B 111/00 | (2006.01) |

(52) U.S. Cl.
CPC ............ *C04B 14/066* (2013.01); *C04B 28/02* (2013.01); *B82Y 30/00* (2013.01); *C04B 2103/50* (2013.01); *C04B 2111/00008* (2013.01)

(58) Field of Classification Search
CPC ... C04B 14/066; C04B 28/02; C04B 2103/50; C04B 2111/00008; C04B 40/0039; B82Y 30/00
See application file for complete search history.

(56) References Cited

U.S. PATENT DOCUMENTS

| 6,875,801 B2 | 4/2005 | Shendy et al. |
| 2016/0002108 A1 | 1/2016 | Chen et al. |

FOREIGN PATENT DOCUMENTS

| CN | 1244184 A | 2/2000 |
| EP | 1 138 697 A1 | 10/2001 |
| EP | 2 522 680 A1 | 11/2012 |
| EP | 2 757 081 A1 | 7/2014 |
| EP | 2 966 049 A1 | 1/2016 |
| GB | 2 378 946 A | 2/2003 |
| WO | 98/031643 A1 | 7/1998 |
| WO | 01/042162 A1 | 6/2001 |
| WO | 03/018505 A2 | 3/2003 |
| WO | 2013/158870 A2 | 10/2013 |
| WO | 2015/144886 A1 | 10/2015 |
| WO | 2017/050907 A1 | 3/2017 |

OTHER PUBLICATIONS

Middleton et al. "Interaction of Sodium Dodecyl Sulfate with Methacrylate-PEG Comb Copolymers", Langmuir, 21, 5174-5178 (Year: 2005).*
Aug. 21, 2019 International Search Report issued in International Patent Application No. PCT/EP2019/068491.
Jan. 19, 2021 International Preliminary Report on Patentability issued in International Patent Application No. PCT/EP2019/068491.

* cited by examiner

*Primary Examiner* — Anthony J Green
(74) *Attorney, Agent, or Firm* — Oliff PLC

(57) ABSTRACT

A defoamed aqueous composition including 5 to 75 weight-% of at least one anionic polymer, 0.05 to 5 weight-% of at least one water insoluble liquid defoamer and 0.005 to 3 weight-% of at least one polysaccharide, based on 100 weight-% of the composition. The composition gives predictable air content in non-air entrained and air-entrained mortar and concrete.

13 Claims, No Drawings

CONCRETE ADMIXTURE

TECHNICAL FIELD

The invention relates to an aqueous composition comprising an anionic polymer, a water insoluble defoamer and a polysaccharide and its use in inorganic binder compositions.

BACKGROUND OF THE INVENTION

Admixtures for construction materials like concrete or mortar, are widely used to improve the quality of the fresh and hardened material, for example strength, flow, water tightness, chemical resistance and others. Most of the admixtures are used as aqueous solutions or dispersions. Unfortunately, some admixtures tend to introduce air. This tendency to introduce air is typically for some plasticizers, especially the very effective superplasticizers with comb-polymer structure. A high air content, however, reduces strength and durability of the hardened material. Therefore, typically a defoamer is added to such admixtures. Defoamers are mostly hydrophobic substances based on silicon or mineral oils, phosphate esters or polypropylene glycol-derivatives. Unfortunately, these defoamers are typically poorly water soluble and have the tendency to separate from the aqueous solution. If this happens, defoamer comes out and forms a layer on the top of the admixture. Thus, the bottom part of the admixture has air entraining properties and the top portion has defoaming properties. This exposes the concrete producer to potential issues related to low strength and poor durability of the hardened material. Furthermore, the air content of freshly mixed concrete is affected by many factors. For example, temperature, amount of added water, aggregate gradation, cement type, grinding aid or other admixtures are factors that may cause air fluctuation. Thus, depending on the composition, the air content in the concrete may still be too high, even when defoamed admixtures are used.

A second obstacle in the use of defoamers in admixtures is the fact, that in concrete with freeze-thaw resistance, fine air voids must be introduced into the matrix. This is typically done by addition of air entraining agents. In this case, the defoamer must not negatively interact with theses air entraining agents. Unfortunately, the combination of concrete admixtures with defoamers and air entraining agents often results in an unpredictable air content of the concrete. Thus, in some cases an unexpected high air content is gained, in others the air content constantly rises with mixing time, in other cases the air content drops dramatically with time or the air content goes up and down. This is especially problematic in ready mix concrete since the air content measured at the concrete plant and at job site may differ drastically. As the air content of a concrete is a highly critical factor because it directly determines the strength of the hardened material, this is a quite unsatisfying situation.

There have been efforts to increase the amount of defoamer in concrete admixtures.

EP 1 242 330 describes the use of solubilizing agents admixed with water insoluble defoamers and dispersants as admixture for cementitious compositions. As solubilizing agents alkoxylated substances or styrene-maleic copolymers are described.

U.S. Pat. No. 6,875,801 uses an amine-solubilizing agent to stabilize a water insoluble defoamer in an admixture composition.

WO 2013/158870 describes an additive composition for modifying cementitious compositions comprising a) a water-dispersible defoamer comprising polyalkylenoxide, b) a polycarboxylate cement dispersant and c) colloidal nanoparticles having an average size of 8-150 nanometres.

There is still demand for improvement.

What is needed is a stable defoamed admixture for construction materials that does not entrain an undesired amount of air. Additionally, it should be compatible with air entraining agents to give predictable air content without dramatically increase or decrease of the air content during transport and placing.

SUMMARY OF THE INVENTION

It is therefore task of the present invention to provide a stable defoamed aqueous composition that does not introduce an undesired high amount of air when used in construction materials. Additionally, the defoamed composition should be compatible with air entraining agents to produce high quality air entrained concrete.

It was surprisingly found that this task can be fulfilled by an aqueous composition described in claim 1.

The addition of a polysaccharide to the aqueous composition comprising an anionic polymer and a water insoluble liquid defoamer, surprisingly gives storage stable compositions. It allows to increase the amount of insoluble defoamer without affecting the stability of the composition. The increased amount of defoamer prevents an undesired high air content in inorganic binder compositions. The stable composition guaranties a constant amount of defoamer throughout the drum or container in which it is stored.

Additionally, the aqueous composition of the present invention is surprisingly highly compatible with air entraining agents. The amount of air introduced into the fresh construction material is predictable and the air content is stable even for up to 60 minutes or more. Thus, high quality air entrained concrete or mortar, which can be transported and placed without loss of quality, can be produced.

Further aspects of the invention are subject of further independent claims. Specially preferred embodiments are subject of the dependent claims.

DETAILED DESCRIPTION OF THE INVENTION

Subject of the invention is an aqueous composition comprising
  5 to 75 weight-% of at least one anionic polymer,
  0.05 to 5 weight-% of at least one water insoluble liquid defoamer and
  0.005 to 3 weight-% of at least one water soluble polysaccharide,
based on 100 weight-% of the composition.

The term "water insoluble" in this document refers to a property of a substance that does not fully dissolve when added with more than 0.6 g to 100 g of distilled water at 20° C.

The anionic polymer is preferably present in 10 to 70 weight-%, more preferably 12 to 65 weight-%, based on 100% of the aqueous composition. The anionic polymer is preferably an admixture used in construction industry to improve the performance of construction materials like concrete, mortar, cement pastes or gypsum products.

Examples for such anionic polymers are dispersing agents, plasticizers, water reducers, superplasticizers, workability retainers, polymeric retarders, stabilizers, polymeric shrinkage reducers or rheology improvers.

Such admixtures are well known in construction industry.

The anionic polymer is preferably selected from the group comprising plasticizers, water reducers, superplasticizers and workability retainers. The anionic polymer preferably comprises at least one anionic group selected from the group comprising —COOM, —SO$_2$-OM, —O—PO(OM)$_2$ and —PO(OM)$_2$-groups, with M, independent from each other, being H+, an alkali metal ion, an earth alkali metal ion, a di- or trivalent metal ion, an ammonium ion or an organic ammonium group, preferably H+ and/or an alkali metal ion. Exemplary anionic polymers are lignosulfonates, sulfonated naphthalene formaldehyde condensates, sulfonated melamine formaldehyde condensates, sulfonated vinyl copolymers, polyalkylene glycols comprising phosphonate groups, polyalkylene glycols comprising phosphate groups, polycarboxylates or anionic comb-polymers comprising polyalkylene glycol side chains.

The term polycarboxylate refers to a polymer comprising more than one carboxylate group. The carboxylate groups are preferably derived from polymerized monomers like acrylic acid, methacrylic acid, maleic acid, fumaric acid or itaconic acid.

Preferably, at least one anionic polymer is an anionic comb-polymer comprising polyalkylene glycol side chains.

The term "anionic comb-polymer comprising polyalkylene glycol side chains" refers to a polymer comprising anionic groups at the backbone of the polymer and side chains of polyalkylene glycol. The anionic groups are preferably selected from the group consisting of carboxylate groups, sulfonate groups, sulfate groups phosphate groups and phosphonate groups. The side chains are preferably bound via ester, ether, imide and/or amide groups to the polymer backbone.

The polyalkylene glycol side chains are preferably composed of ethylene glycol or propylene glycol or ethylene- and propylene glycol. Most preferred are side chains of polyethylene glycol.

Preferably, the comb-polymer comprises structural units of formula I

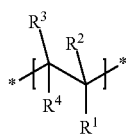 (I)

and structural units of formula II,

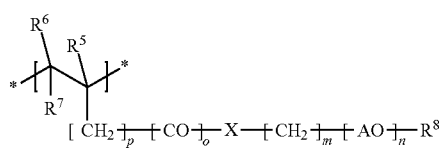 (II)

where
$R^1$, in each case independently of any other, is —COOM, —SO$_2$-OM, —O—PO(OM)$_2$ and/or —PO(OM)$_2$,
$R^2$ and $R^5$, in each case independently of any other, are H, —CH$_2$—COOM or an alkyl group having 1 to 5 carbon atoms,
$R^3$ and $R^6$, in each case independently of any other, are H or an alkyl group having 1 to 5 carbon atoms,
$R^4$ and $R^7$, in each case independently of any other, are H, —COOM or an alkyl group having 1 to 5 carbon atoms, or where $R^1$ and $R^4$ form a ring to —CO—O—CO— (anhydride),
M, in each case independently of any other, is H$^+$, an alkali metal ion, an earth alkali metal ion, a di- or trivalent metal ion, an ammonium ion or an organic ammonium group,
p=0, 1 or 2,
o=0 or 1,
m=0, or a number from 1 to 4,
n=2-250, more particularly 10-200,
X, in each case independently of any other, is —O— or —NH—,
$R^8$, in each case independently of any other, is H, a C$_1$- to C$_{20}$-alkyl group, -cyclohexylgroup or -alkylarylgroup, and
A=C$_2$- to C$_4$-alkylene.

Preferably, the molar ratio of structural unit I to structural unit II is 0.7-10:1, more preferred 1-8:1, particularly 1.5-5:1.

With particular advantage, the comb polymer is produced by free radical copolymerisation of monomers comprising anionic groups and monomers comprising polyalkylene glycol chains. Exemplary polymers are for example described in EP 2 522 680.

Also with particular advantage, the comb-polymer is produced by polymer analogous esterification and/or amidation of polymers comprising carboxylic acid groups with at least one polyalkylene glycol that comprises a hydroxyl- or an amino group at one end. Exemplary polymers are for example described in EP 1 138 697.

Also with particular advantage, the comb-polymer has a block- or gradient structure. Such polymers are typically produced by living radical polymerisation. Exemplary polymers are for example described in WO 2015/144886 and in WO 2017/050907.

Preferably, the anionic polymer is an anionic comb-polymer comprising carboxylic acid and/or salt groups and polyethylene glycol side chains. Such polymers are special good plasticizers for inorganic binder compositions.

The mass averaged molecular weight (Mw) of the anionic comb-polymer, measured with SEC against polyethylene glycol standards with 0.1 N NaNO3 at pH 12 as eluent, is preferably 5'000 to 200'000 g/mol, more preferred 8'000 to 150'000 g/mol, especially preferred 10'000 to 130'000 g/mol, particularly 12'000 to 80'000 g/mol.

The aqueous composition of the invention comprising such anionic polymers shows good storage stability and is perfectly suited as defoamed plasticizer or superplasticizer for inorganic binders, especially for mortar or concrete.

Preferably, the aqueous composition comprises more than one anionic polymer, especially, two or more anionic polymers.

Such polymer combinations are especially useful to adapt the performance of the aqueous composition to the needs of the specific application.

The at least one water insoluble liquid defoamer is preferably a mineral or vegetable oil, a fatty acid, a fatty acid ester, a fatty alcohol, an alkoxylated fatty acid, an alkoxylated fatty alcohol, a polyalkylene glycol derivative comprising units of propylene glycol and/or butylene glycol, an acetylenic compound, an organic silicone compound or an organic phosphate ester.

Preferably, the water insoluble liquid defoamer is an organic phosphate ester, especially triisobutyl phosphate (TiBP) or tributyl phosphate (TBP).

Especially preferred is tributyl phosphate (TBP).

Preferably, the defoamer is present in 0.1 to 3 weight-%, more preferably 0.2 to 2 weight-%, even more preferably 0.25 to 1 weight-%, based on 100 weight-% of the aqueous composition.

It may be of advantage if the water insoluble liquid defoamer is mixed with a non-ionic emulsifying agent before it is added to the aqueous composition. Preferred is a weight-ratio of 80 to 99.5 parts of insoluble defoamer with 0.5 to 20 parts of non-ionic emulsifying agent giving 100 parts of the pre-mix. This may further improve the stability of the aqueous composition.

The water soluble polysaccharide is a natural or a modified polysaccharide. Exemplary polysaccharides involve water soluble cellulose ethers or esters, modified starches, hemicelluloses or gums.

The dosage of the polysaccharide is dependent on the type of the polysaccharide and type and dosage of the other components in the aqueous additive composition.

A dosage below 0.005 weight-% might be insufficient to stabilize the composition and a dosage of more than 3 weight-% could lead to undesired high viscosity of the aqueous composition.

The polysaccharide is preferably a microbial polysaccharide, particularly selected from the group consisting of welan gum, xanthan gum, diutan gum and gellan gum, preferably diutan gum.

Such gums are water soluble, compatible with many chemicals that may be part of the aqueous composition and do not influence the setting of an inorganic binder in an undesired way. They are very effective to stabilize the defoamer in the composition, even at low dosage.

Advantageously, the polysaccharide is present in 0.006 to 0.2 weight-%, preferably 0.007 to 0.15 weight-%, more preferably 0.008 to 0.1 weight-%, especially preferred 0.009 to 0.09 weight-%, based on 100 weight-% of the aqueous composition.

Preferably, the polysaccharide is diutan gum. The dosage of diutan gum in the aqueous composition is preferably 0.01 to 0.07 weight-%.

Diutan gum used in such a dosage, has optimum performance to stabilize the insoluble liquid defoamer in the aqueous composition. A lower dosage may be insufficient in some compositions, a higher dosage may lead to undesired high viscosity.

A low dosage further allows for cost optimization.

Preferably, the microbial polysaccharide is the only polysaccharide in the aqueous composition.

Advantageously, the aqueous composition comprises a biocide in sufficient amount to avoid bacterial growth.

It is advantageous if the aqueous composition further comprises 0.05 to 5 weight-%, preferably 0.1 to 2 weight-%, more preferably 0.15 to 1 weight-%, even more preferably 0.2 to 0.8 weight-%, especially 0.25 to 0.6 weight-%, inorganic nano-particles, based on 100 weight-% of the aqueous composition.

A dosage below 0.05 weight-% might be insufficient whereas a high dosage will unnecessaraly increase the costs.

The term "inorganic nano-particles" refers to inorganic particles that are typically from 1 to 1000 nm in size. Such particles, when dispersed in a liquid, do not settle appreciably and cannot be easily filtered.

The inorganic nano-particles may be of any inorganic material that is inert within an aqueous composition. Preferably the inorganic nano-particles are particles of silica ($SiO_2$), alumina ($Al_2O_3$), calcium carbonate ($CaCO_3$) or titanium dioxide ($TiO_2$).

Preferably, the inorganic nano-particles are of amorphous silica, especially precipitated silica.

Preferably, the average particle size of the inorganic nano-particles is below 100 nm, more preferably below 80 nm, even more preferably below 50 nm, especially preferred below 30 nm, particularly below 10 nm or even below 8 nm.

Especially preferred are inorganic nano-particles with an average particle size of about 3 to 7 nm.

Nano-particles of such dimension provide a special high surface area and help to stabilize the insoluble defoamer in the composition. They also improve the air stability in mortars or concrete comprising the aqueous composition of the present invention.

Low average particle size, especially below 10 nm, or even better 7 nm or below, enables especially stable compositions without introducing additional turbidity.

The combination of the inorganic nano-particles with the polysaccharide allows for low dosages of each in the composition, which reduces costs and also prevents a too high viscosity of the solution.

Surprisingly, the inorganic nano-particles in combination with the polysaccharide improve the air stability in air entrained concrete or mortar comprising the aqueous composition.

Preferably the aqueous composition further comprises 0.1 to 10 weight-%, more preferably 0.5 to 5 weight-%, of at least one polyalkylene glycol or polyalkylene glycol-derivative with a water solubility of at least 10 weight-% at 20° C.

Preferably, the polyalkylene glycol or polyalkylene glycol-derivative has a number average molecular weight Mn of 300 to 5000 g/mol, more preferably 500 to 3000 g/mol.

Preferably, the polyalkylene glycol or polyalkylene glycol derivative comprises ethylene glycol and/or propylene glycol units.

Preferably, a blend of different polyalkylene glycols is used.

The water soluble polyalkylene glycol is not only able to further increase the stability of the aqueous composition, it can further act as air content regulator in concrete or mortar.

The aqueous composition may comprise further components, particularly used in concrete- or mortar admixtures. Exemplary further components comprise accelerators, shrinkage reducers, surfactants, colouring agents, retarders, rheology modifiers, pumping aids and corrosion inhibitors.

The aqueous composition preferably comprises:

20 to 89 weight-% water, 5 to 75 weight-%, preferably 10 to 70 weight-%, more preferred 12 to 65 weight-%, of at least one anionic polymer, preferably at least one comb-polymer comprising anionic groups and polyalkylene glycol side chains, 0.05 to 5 weight-%, preferably 0.1 to 3 weight-%, more preferably 0.2 to 2 weight-%, even more preferably 0.25 to 1 weight-%, water insoluble liquid defoamer, especially an organic phosphate ester, preferably TBP, 0.005 to 3 weight-%, particularly 0.01 to 0.07 weight-%, of at least one water soluble polysaccharide, especially a microbial polysaccharide, preferably diutan, welan or xanthan gum, more preferably dituan gum, 0.05 to 5 weight-%, preferably 0.1 to 2 weight-%, more preferably 0.15 to 1 weight-%, even more preferably 0.2 to 0.8 weight-%, especially 0.25 to 0.6 weight-%, inorganic nano-particles, especially amorphous silica, preferably with a medium particle size of 3 to 7 nm, 0.1 to 10 weight-%, preferably 0.5 to 5 weight-%, of at least one water soluble polyalkylene glycol or polyalkylene glycol-derivative, and 0 to 10 weight-% further additives, based on 100 weight-% of the composition.

The aqueous composition can be prepared by simply mixing all components until a homogeneous liquid is gained.

It might be of advantage to first dissolve the polysaccharide in an aqueous solution of the anionic polymer, and, after fully dissolution of the polysaccharide, addition of the other components.

It might also be of advantage, if the water soluble polymer, the nano-particles and the polysaccharide are used as aqueous solutions or dispersions. Preferably, the anionic polymer is used as 20 to 80 weight-%, more preferred 30 to 75 weight-%, solution.

Preferably, the inorganic nano-particles are used as colloidal dispersion of 5 to 50 weight-%, more preferred 10 to 30 weight-%.

Preferably, the polysaccharide is used as 0.08 to 0.5 weight-%, more preferred 0.1 to 0.2 weight-%, solution that comprises a biocide.

It further may be of advantage, if the polysaccharide is first homogeneously dispersed in a water soluble liquid, preferably an alkylene glycol, oligoalkylene glycol or polyalkylene glycol, before water is added and the mixture is stirred until the polysaccharide is fully dissolved.

A further aspect of the invention is the use of the aqueous composition in inorganic binder compositions, particularly binder compositions comprising cement and/or gypsum.

Preferably, the aqueous composition of the invention is used in 0.2 to 5 weight-%, more preferred 0.25 to 4 weight-%, even more preferred 0.3 to 2 weight-%, based on the weight of the inorganic binder.

The inorganic binder composition comprises at least one inorganic binder. The expression "inorganic binder" refers in particular to a binder which reacts in the presence of water in a hydration reaction to form solid hydrates or hydrate phases. This may be, for example, a hydraulic binder (e.g., cement or hydraulic lime), a latent hydraulic binder (e.g., slag), a pozzolanic binder (e.g., fly ash), or a non-hydraulic binder (e.g., gypsum or white lime).

More particularly the inorganic binder or the binder composition comprises a hydraulic binder, preferably cement. Particularly preferred is a cement having a cement clinker fraction of ≥35 weight-%. The cement more particularly is of type CEM I, CEM II, CEM III, CEM IV or CEM V (in accordance with standard EN 197-1). Cements which are produced according to an alternative standard, for example ASTM C150 for Portland cement types or ASTM C595 for blended hydraulic cements, as well as other national standards like the Indian standard or the Japanese standard JIS, are equally suitable.

The fraction of the hydraulic binder in the inorganic binder as a whole is advantageously at least 5 weight-%, more particularly at least 20 weight-%, preferably at least 35 weight-%, especially at least 65 weight-%. According to a further advantageous embodiment, the inorganic binder consists to an extent of ≥95 weight-% of hydraulic binder, more particularly of cement or cement clinker.

It may, however, also be advantageous for the inorganic binder or inorganic binder composition to comprise or consist of other binders. These are, in particular, latent hydraulic binders and/or pozzolanic binders. Examples of suitable latent hydraulic and/or pozzolanic binders are slag, fly ash and/or silica dust. The binder composition may also comprise inert substances such as limestone, finely ground quartzes and/or pigments, for example. In one advantageous embodiment the inorganic binder comprises 5-95 weight-%, more particularly 5-65 weight-%, very preferably 15-35 weight-%, of latent hydraulic and/or pozzolanic binders. Advantageous latent hydraulic and/or pozzolanic binders are slag and/or fly ash.

Also preferred as inorganic binder is a binder comprising plaster or anhydrite, especially with at least 50 weight-%, particularly at least 80 weight-%, plaster or anhydrite, based on the weight of the inorganic binder.

The inorganic binder composition preferably further comprises inert materials like inorganic filler, sand and aggregates.

The inorganic binder composition is preferably a mortar or concrete composition.

The inorganic binder composition is in particular an inorganic binder composition which can be made up with water and/or is workable.

The weight ratio of water to binder in the inorganic binder composition is preferably in the range of 0.25 to 0.7, more preferably 0.28 to 0.65, especially 0.30 to 0.60.

The inorganic binder composition may further comprise additives, particularly concrete or mortar additives.

Exemplary further additives comprise accelerators, shrinkage reducers, surfactants, colouring agents, biocides, retarders, film forming polymer suspensions, air entraining agents, rheology modifiers, pumping aids, foaming agents or corrosion inhibitors or mixtures thereof.

Preferably, the inorganic binder composition is a mortar or concrete comprising cement.

Another aspect of the invention is an inorganic binder composition comprising the aqueous composition of this invention and an air entraining agent. Preferably, the inorganic binder in this inorganic binder composition is a cementitious binder and the inorganic binder composition has an air content of 4 to 10%, measured directly after mixing with water.

The aqueous composition of the present invention thus does not affect the air content of an inorganic binder composition. It is, however, also possible that the aqueous composition of the present invention stabilizes the air content of the inorganic binder composition.

The aqueous composition of the present invention may thus be used in a process to stabilize the air content of an inorganic binder composition, optionally comprising an air entraining agent, characterized in that said aqueous composition is admixed to said inorganic binder composition. Preferably, the aqeuous composition of the present invention is used in said process in 0.2 to 5 weight-%, more preferred 0.25 to 4 weight-%, even more preferred 0.3 to 2 weight-%, based on the weight of the inorganic binder.

The aqueous composition of the present invention can be admixed to the inorganic binder composition before addition of mixing water, together with the mixing water or part thereof, and/or shortly after addition of the mixing water. It is preferred, that the aqueous composition is added before or together with the mixing water.

An additional aspect of the present invention pertains to a shaped article, more particularly a constituent of a construction, obtainable by curing an inorganic binder composition comprising the aqueous composition of this invention, after mixing with water.

The construction may be, for example, a bridge, a building, a tunnel, a roadway, or a runway.

Further advantageous embodiments of the invention are apparent from the working examples hereinafter.

EXAMPLES

The following examples, without being limitative, illustrate the present invention.

1. Materials

PCE-1: 60 weight-% aqueous superplasticizer solution comprising 53.4 weight-% of a comb-polymer type superplasticizer with carboxylic acid groups and polyethylene glycol side chains and 6.6 weight-% of an anionic polymer. The pH of PCE-1 is about 3.5.

$SiO_2$ nano-particles: 15 weight-% colloidal amorphous nano-silica in water, clear aqueous liquid with pH=9.5.

Polyalkylene glycol blend: blend of non-ionic water soluble polyalkylene glycols based on ethylene glycol and propylene glycol.

Defoamer: blend of tributyl phosphate (TBP) with a non-ionic emulsifying agent that comprises at least 85 weight-% of TBP.

Sika® Air-260: air entraining agent, available from Sika Corporation, USA.

2. Methods

The stability of the aqueous composition was judged visually. About 200 ml of the aqueous composition were prepared and stored in glass bottles of 250 ml volume at 20° C. and 37° C., respectively. For better visualization of separations on the surface, a colouring agent was added to the defoamer. After defined time intervals, the samples were inspected and checked for phase separation.

The slump of the mortar was measured according to ASTM C1437.

The air content of the mortar was measured according to ASTM C185.

The air content of the concrete was measured according to ASTM C231.

3. Formulation and Stability of Aqueous Compositions

TABLE 1

Formulation and stability of defoamed superplasticizer compositions SP-1 to SP-6. The values show the weight-% of the components in the composition.

| Defoamed super-plasticizer composition | SP-1 | SP-2 | SP-3 | SP-4 | SP-5 | SP-6 |
|---|---|---|---|---|---|---|
| PCE-1 | 41.5 | 41.5 | 41.5 | 41.5 | 41.5 | 41.5 |
| Defoamer | 0.1 | 0.3 | 0.3 | 0.3 | 0.3 | 0.3 |
| Diutan gum (0.1 weight-% in water) | 0 | 0 | 0 | 50 | 50 | 50 |
| $SiO_2$ nano-particles | 0 | 0 | 3.5 | 0 | 3.5 | 3.5 |
| Polyalkylene glycol blend | 0 | 0 | 0 | 0 | 0 | 1.0 |
| Biocide | 0.1 | 0.1 | 0.1 | 0.1 | 0.1 | 0.1 |
| Water | 58.3 | 58.1 | 54.6 | 8.1 | 4.6 | 3.6 |
| Stable after 7 days at 20° C. | yes[1] | no[2] | no | yes | yes | yes |
| Stable after 7 days at 37° C. | yes | no | no | yes | yes | yes |

[1]stable: homogeneous liquid
[2]not stable: oily layer separated on surface

TABLE 2

Formulation and stability of defoamed superplasticizer compositions SP-7 to SP-10. The values show the weight-% of the components in the composition.

| Defoamed superplasticizer composition | SP-7 | SP-8 | SP-9 | SP-10 |
|---|---|---|---|---|
| PCE-1 | 37.9 | 37.9 | 37.9 | 37.9 |
| Defoamer | 0.1 | 0.3 | 0.3 | 0.3 |
| Diutan gum | 0 | 0 | 0.058 | 0.058 |
| $SiO_2$ nano-particles | 0 | 3.0 | 0 | 3.0 |
| Polyalkylene glycol blend | 1.0 | 1.0 | 1.0 | 1.0 |
| Biocide | 0.1 | 0.1 | 0.1 | 0.1 |
| Water | 60.9 | 57.7 | 60.6 | 57.6 |
| Stable 7 days at 20° C. | yes[1] | no[2] | yes | yes |
| Stable 7 days at 37° C. | yes | no | yes | yes |

[1]stable: homogeneous liquid
[2]not stable: oily layer separated on surface

4. Preparation of the Defoamed Superplasticizer Compositions

Preparation of SP-1 to SP-3

PCE-1 and water were mixed in a beaker, next $SiO_2$ nano-particles, defoamer, and biocide were added in the amount given in table 1 to the stirred mixture. The mixture was stirred with a mechanical stirrer until it was homogeneous.

Preparation of SP-4 to SP-6

Diutan gum was dissolved in water with stirring to prepare a 0.1 weight-% solution. Then PCE-1, $SiO_2$ nano-particles, defoamer, polyalkylene glycol blend, biocide and water were added in the amount given in table 1 to the stirred mixture. The mixture was stirred until it was homogeneous.

Preparation of SP-7 and SP-8

PCE-1 and water were mixed in a beaker, next $SiO_2$ nano-particles, defoamer, polyalkylene glycol blend and biocide were added in the amount given in table 2 to the stirred mixture. The mixture was stirred with a mechanical stirrer until it was homogeneous.

Preparation of SP-9 and SP-10

Diutan gum was added to the stirred PCE-1 solution and the mixture was stirred until the gum was fully dissolved. Next, water, $SiO_2$ nano-particles, defoamer, polyalkylene glycol blend and biocide were added in the amount given in table 2 to the stirred mixture. The mixture was stirred with a mechanical stirrer until it was homogeneous.

5. Concrete Tests

The performance of defoamed superplasticizer compositions was tested in concrete without and with addition of an air entraining agent.

Details on the concrete are given in table 3. The air content, measured at pre-defined time intervals, is given in tables 4 and 5. Table 4 shows the air content without air entraining agent and table 5 shows the air content with air entraining agent.

TABLE 3

Composition of the concrete

| Component | Quantity |
|---|---|
| Cement ASTM Type I/II (Holcim) | 15.4 kg |
| Sand 0.07-4.75 mm | 33.4 kg |
| Coarse aggregate 2.37-25.4 mm | 44.7 kg |
| Water | 6.24 kg |

Preparation of the Concrete

Sand plus coarse aggregate and 90% of the water were mixed for 1 minute in a drum mixer at speed 28 rpm, then the cement was added and the concrete was mixed for another minute, then the rest of the water was added and the concrete was mixed at speed 28 rpm for additional 3 minutes, finally the admixtures were added in the amount given in table 4 and table 5 and the concrete was mixed for additional 3 minutes at speed 28 rpm. The mixer was stopped and samples for measurements were taken. Next the mixer speed was set to 8 rpm until the last measurement and only stopped for taking samples.

Test Results

TABLE 4

Concrete without air entraining agent. Air content immediately after mixing and after defined time intervals. The concrete was produced with 105 g of the aqueous admixtures SP-1, SP-4, SP-5 and SP-6, respectively; W/C = 0.405.

| Defoamed superplasticizer composition | Test 1 SP-1 | Test 2 SP-4 | Test 3 SP-5 | Test 4 SP-6 |
|---|---|---|---|---|
| Minutes | Air after x min [%] | | | |
| 0 | 7.8 | 3.0 | 2.8 | 2.5 |
| 20 | 10.0 | 3.2 | 3.3 | 2.6 |
| 40 | 9.6 | 3.5 | 3.2 | 2.8 |
| 60 | 7.3 | 3.2 | 3.3 | 3.0 |
| 80 | 7.5 | 3.0 | 2.9 | 2.6 |
| Difference of maximum and minimum air content | 2.7 | 0.5 | 0.5 | 0.5 |

TABLE 5

Concrete with air entraining agent. Air content immediately after mixing and after defined time intervals. The concrete was produced with 105 g of the aqueous admixtures SP-1, SP-4, SP-5 and SP-6, respectively, and 1.0 g of Sika ® Air-260; W/C = 0.405.

| Defoamed superplasticizer composition | Test 5 SP-1 | Test 6 SP-4 | Test 7 SP-5 | Test 8 SP-6 |
|---|---|---|---|---|
| Minutes | Air after x min [%] | | | |
| 0 | 9.2 | 5.0 | 5.5 | 5.4 |
| 20 | 16.0 | 8.0 | 8.6 | 7.6 |
| 40 | 17.0 | 9.0 | 9.0 | 7.3 |
| 60 | 18.0 | 10.0 | 9.7 | 7.2 |
| 80 | 17.5 | 9.9 | 9.2 | 7.4 |
| Difference of maximum and minimum air content | 8.8 | 5.0 | 4.2 | 2.2 |

6. Mortar Tests

The performance of defoamed superplasticizer compositions was tested in mortar with and without addition of air entraining agent.

The composition of the mortar is given in table 6. The initial slump and the air content, measured at pre-defined time intervals, are given in tables 7 and 8. Table 8 shows the air content without air entraining agent and table 9 shows the air content with air entraining agent.

TABLE 6

Composition of the mortar

| Component | Quantity |
|---|---|
| Cement ASTM Type I/II (Holcim) | 972 g |
| Sand 0.07-4.75 mm | 790 g |
| Sand 0.60-3.35 mm | 2387 g |
| Water | 440 g |

Preparation of the Mortar

Cement and sand were mixed for 1 minute in a Hobart mixer at speed 1, then water including the admixtures in the amount given in table 8 and table 9 was added and the mortar was mixed for another 3 minutes at speed 1.

Before each measurement the mortar was remixed by hand for 30 seconds.

Test Results

TABLE 7

Mortar without air entraining agent. Slump directly after mixing and air content immediately after mixing and after defined time intervals. The mortar was produced with 6.6 g of the aqueous admixtures SP-7, SP-9 and SP-10, respectively; W/C = 0.453.

| Defoamed superplasticizer composition | Test 9 SP-7 | Test 10 SP-9 | Test 11 SP-10 |
|---|---|---|---|
| Slump after mixing [mm] | 95 | 95 | 102 |
| Minutes | Air after x min [%] | | |
| 0 | 4.6 | 3.2 | 2.5 |
| 20 | 3.5 | 3.3 | 2.7 |
| 40 | 3.9 | 3.2 | 3.1 |
| 60 | 3.8 | 3.4 | 3.0 |
| Difference of maximum and minimum air content | 1.1 | 0.2 | 0.5 |

TABLE 8

Mortar with air entraining agent. Slump directly after mixing and air content immediately after mixing and after defined time intervals. The mortar was produced with 6.6 g of the aqueous admixtures SP-7, SP-9 and SP-10, respectively, and 0.06 g of Sika ® Air-260; W/C = 0.453.

| Defoamed superplasticizer composition | Test 12 SP-7 | Test 13 SP-9 | Test 14 SP-10 |
|---|---|---|---|
| Slump after mixing [mm] | 111 | 105 | 102 |
| Minutes | Air after x min [%] | | |
| 0 | 7.3 | 6.0 | 5.2 |
| 20 | 5.6 | 5.6 | 4.5 |
| 40 | 5.7 | 4.4 | 4.8 |
| 60 | 6.0 | 4.3 | 5.3 |
| 80 | 6.5 | 4.6 | 6.0 |
| Difference of maximum and minimum air content | 1.7 | 1.7 | 0.8 |

The invention claimed is:

1. An aqueous composition comprising
   5 to 75 weight-% of at least one anionic polymer that includes an anionic comb-polymer comprising polyalkylene glycol side chains,
   0.05 to 5 weight-% of at least one water insoluble liquid defoamer,
   0.005 to 3 weight-% of at least one water soluble polysaccharide, and
   0.05 to 5 weight-% inorganic nano-particles,
   based on 100 weight-% of the aqueous composition.

2. The aqueous composition according to claim 1, wherein the anionic polymer comprises one or more selected from the group consisting of plasticizers, water reducers, superplasticizers and workability retainers.

3. The aqueous composition according to claim 1, wherein the water insoluble liquid defoamer is an organic phosphate ester.

4. The aqueous composition according to claim 1, wherein the water soluble polysaccharide a microbial polysaccharide, selected from the group consisting of welan gum, xanthan gum, diutan gum and gellan gum.

5. The aqueous composition according to claim 1, wherein the polysaccharide is present in 0.006 to 0.2 weight-%, based on 100 weight-% of the aqueous composition.

6. The aqueous composition according to claim 1, wherein the inorganic nano-particles are of amorphous silica.

7. The aqueous composition according to claim 1, wherein the inorganic nano-particles have an average particle size of below 100 nm.

8. The aqueous composition according to claim 1, further comprising 0.1 to 10 weight-% of at least one polyalkylene glycol or polyalkylene glycol-derivative with a water solubility of at least 10 weight-% at 20° C.

9. The aqueous composition according to claim 1, further comprising
   20 to 89 weight-% water,
   0.1 to 10 weight-% of at least one water soluble polyalkylene glycol or polyalkylene glycol-derivative, and
   0 to 10 weight-% further additives,
based on 100 weight-% of the aqueous composition.

10. An inorganic binder composition comprising (i) cement and/or gypsum, and (ii) the aqueous composition according to claim 1.

11. An inorganic binder composition comprising the aqueous composition according to claim 1 and an air entraining agent.

12. The inorganic binder composition according to claim 11, wherein the inorganic binder is a cementitious binder and the inorganic binder composition has an air content of 4 to 10% measured directly after mixing with water.

13. A shaped article obtained by curing an inorganic binder composition comprising the aqueous composition of claim 1, after mixing with water.

* * * * *